(12) United States Patent
Haruki

(10) Patent No.: US 12,381,235 B2
(45) Date of Patent: Aug. 5, 2025

(54) FUEL CELL SYSTEM

(71) Applicant: Honda Motor Co., Ltd., Tokyo (JP)

(72) Inventor: Tatsuro Haruki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 17/993,873

(22) Filed: Nov. 24, 2022

(65) Prior Publication Data
US 2024/0178414 A1    May 30, 2024

(51) Int. Cl.
| | | |
|---|---|---|
| H01M 8/04014 | (2016.01) | |
| H01M 8/04089 | (2016.01) | |
| H01M 8/04119 | (2016.01) | |
| H01M 8/04303 | (2016.01) | |
| H01M 8/0432 | (2016.01) | |
| H01M 8/04537 | (2016.01) | |
| H01M 8/04701 | (2016.01) | |
| H01M 8/04746 | (2016.01) | |

(52) U.S. Cl.
CPC ... *H01M 8/04097* (2013.01); *H01M 8/04014* (2013.01); *H01M 8/04141* (2013.01); *H01M 8/04164* (2013.01); *H01M 8/04303* (2016.02); *H01M 8/0432* (2013.01); *H01M 8/04649* (2013.01); *H01M 8/04701* (2013.01); *H01M 8/04753* (2013.01); *H01M 8/04761* (2013.01); *H01M 2250/20* (2013.01)

(58) Field of Classification Search
CPC ......... H01M 2250/20; H01M 8/04014; H01M 8/04029; H01M 8/04097; H01M 8/04141; H01M 8/04164; H01M 8/04228; H01M 8/04303; H01M 8/0432; H01M 8/04649; H01M 8/04701; H01M 8/04753; H01M 8/04761; Y02E 60/50
See application file for complete search history.

(56) References Cited

U.S. PATENT DOCUMENTS

| | | | |
|---|---|---|---|
| 2018/0294490 A1* | 10/2018 | Nakata | H01M 8/04022 |
| 2021/0376341 A1* | 12/2021 | Ozeki | H01M 8/04201 |
| 2022/0333497 A1* | 10/2022 | Lippold | F01D 15/10 |

FOREIGN PATENT DOCUMENTS

JP    2004071251    3/2004

* cited by examiner

*Primary Examiner* — Victoria H Lynch
(74) *Attorney, Agent, or Firm* — JCIPRNET

(57) ABSTRACT

A fuel cell (FC) system is provided, having a FC stack supplied with a reaction gas and performing power generation by electrochemical reaction of the reaction gas. The FC system includes a supply passage, supplying the reaction gas to the FC stack; a discharge passage, distributing an off-gas discharged from a discharge outlet of the fuel cell stack; a bypass passage, communicate between the supply passage and the discharge passage; a cooling passage, provided in the discharge passage and having a heat sink to condense water in the off-gas; a circulation pump, provided in the bypass passage and circulating the off-gas discharged from the discharge passage to the supply passage when the FC system stops. When the FC system stops, as the temperature information of the FC stack from temperature information acquisition unit is equal to or larger than a predetermined first threshold temperature, the controller activates the circulation pump.

17 Claims, 8 Drawing Sheets

FUEL CELL SYSTEM

BACKGROUND

Technical Field

The disclosure relates to a fuel cell system.

Description of Related Art

In the current art, a dehumidifier is provided to be installed in the cathode off-gas discharge passage to deal with the condensed water that occurs when the temperature drops after the operation of the fuel cell system is stopped. Water is condensed and discharged by the cooling evaporator that is connected to a cooling loop included in the vehicle air-conditioner in the dehumidifier.

However, the dew condensation also occurs inside the fuel cell stack when power generation of the fuel cell system is stopped. If the dew condensation occurs inside the fuel cell stack, the condensed water may be frozen. In addition, if the separator of the fuel cell stack is made of metal, the iron ions dissolved from the metal separator lead to deterioration of the electrolyte membrane.

There are no effective countermeasures to be taken against the condensed water that occurs in the fuel cell stack when the temperature drops after the fuel cell system is stopped. Therefore, it is necessary to develop a fuel cell system capable of preventing the dew condensation on the fuel cell stack even when power generation of the fuel cell system is stopped.

SUMMARY

In view of the above description, the disclosure is to provide a solution to prevent the dew condensation on the fuel cell stack even when power generation of the fuel cell system is stopped.

According to one embodiment, a fuel cell system is provided. The fuel cell system has a fuel cell stack that is supplied with a reaction gas and performs a power generation by an electrochemical reaction of the reaction gas. The fuel cell system comprises a supply passage, configured to supply the reaction gas to the fuel cell stack; a discharge passage, configured to distribute an off-gas that is discharged from a discharge outlet of the fuel cell stack; a bypass passage, communicated between the supply passage and the discharge passage; a cooling passage, provided in the discharge passage and having a heat sink to condense water in the off-gas; a circulation pump, provided in the bypass passage and configured to circulate the off-gas discharged from the discharge passage to the supply passage during a stop procedure of the fuel cell system; a controller, configured to control the fuel cell system; and a temperature information acquisition unit, configured to acquire temperature information of the fuel cell stack. During the stop procedure of the fuel cell system, in a case that the temperature information is equal to or larger than a predetermined threshold temperature, the controller is configured to activate the circulation pump.

DESCRIPTION OF THE EMBODIMENTS

Figure 1:
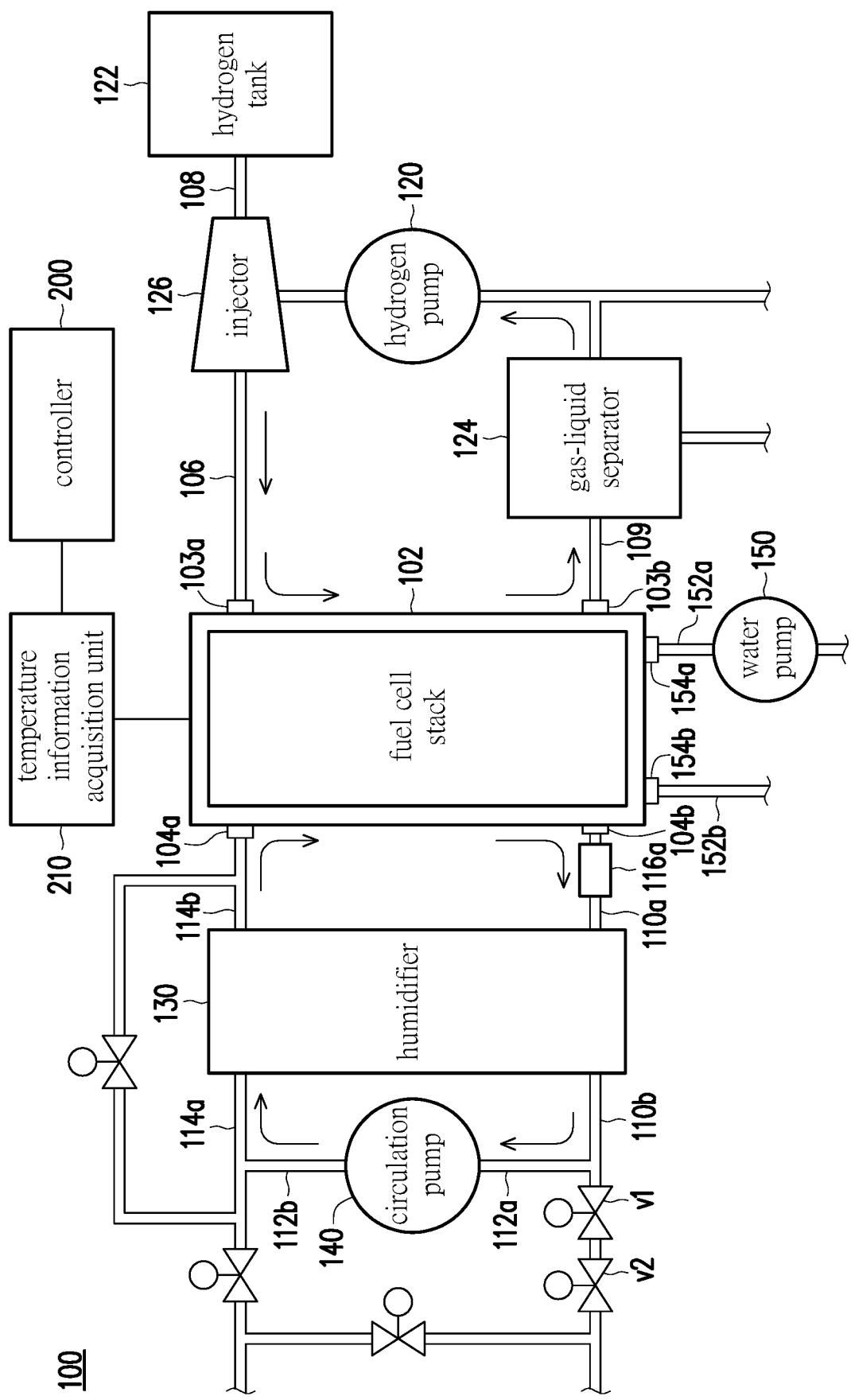
FIG. 1 is a schematic diagram illustrating the configuration of a fuel cell system according to one embodiment of the disclosure.

Reference will now be made in detail to the exemplary embodiments of the present invention, examples of which are illustrated in the accompanying drawings. Wherever possible, the same reference numerals are used in the drawings and description to refer to the same or like parts.

Embodiments of the disclosure will be described below with reference to the accompanying drawings. FIG. 1 is a schematic diagram illustrating the configuration of a fuel cell system according to one embodiment of the disclosure. The fuel cell system 100 comprises a fuel cell stack 102. Further, the fuel cell system 100 comprises an anode system that supplies hydrogen (fuel gas) as a reaction gas to the fuel cell stack 102 and a cathode system that supplies air containing oxygen (oxidant gas) as a reaction gas to the fuel cell stack 102.

The fuel cell stack 102 comprises, for example, a stack structure in which tens to hundreds of cells are stacked. Each fuel cell is constructed by sandwiching a membrane electrode assembly (MEA) between a pair of separators. The membrane electrode construct consists of two electrodes, an anode electrode (anode, not shown) and a cathode electrode (cathode, not shown), and a solid polymer electrolyte membrane sandwiched between the anode electrode and the cathode electrode. The two electrodes are usually formed of a catalyst layer which is in contact with the solid polymer electrolyte membrane and undergoes a redox reaction, and a gas diffusion layer which is in contact with the catalyst layer. In the fuel cell stack 102, by supplying hydrogen to the hydrogen supply passage 106a formed on the anode side and supplying oxygen-containing air to the supply passage 114 formed on the cathode side, electricity is generated by the electrochemical reaction of oxygen and hydrogen.

On the anode system side, a hydrogen tank 122 is provided to supply hydrogen that is delivered to injector 126 via gas supply passage 108, so that the hydrogen is supplied through the hydrogen supply passage 106 to fuel cell stack 102 via hydrogen inlet 103a. After the hydrogen reacts with the oxygen supplied from the cathode system side, the hydrogen is discharged to the discharge passage (hydrogen discharge passage) 109 from the hydrogen discharge outlet 103b. After the discharged hydrogen passes through the gas-liquid separator 124, the water contained in the hydrogen is separated and discharged. Then, the hydrogen is pressurized by the hydrogen pump 120, and supplied to the injector 126. The hydrogen is then supplied to the fuel cell stack 102 again through the hydrogen supply passage 106 and the hydrogen inlet 103a in order.

On the cathode system side, the air is supplied to the fuel cell stack 102 through a supply passage 114 by an air pump (not shown). According to an embodiment of the disclosure, the supply passage 114 may further comprises a first supply passage 114a and a second supply passage 114b, the first supply passage 114a is configured to communicate between the humidifier 130 and the air pump (not shown), the second supply passage 114b is configured to communicate between the humidifier 130 and the air inlet 104a of the fuel cell stack 102.

After the oxygen reacts with the hydrogen in the fuel cell stack 102, the reacted off-gas is discharged to the discharge passage 110 through the air discharge outlet (or simply the discharge outlet) 104b of the fuel cell stack 102. That is, the discharge passage 110 is for circulating the off-gas discharged from the discharge outlet 104b of the fuel cell stack 102. According to an embodiment of the disclosure, the discharge passage 110 may comprise a first discharge passage 110a and a second discharge passage 110b. The first discharge passage 110a is configured to communicate between the discharge outlet 104b of the fuel cell stack 102 and the humidifier 130, and the second discharge passage 110b is used to discharge the off-gas from the humidifier 130.

The humidifier 130 recycles water contained in the gas discharged from the discharge passage 110, and humidifies the gas, which is supplied to the fuel cell stack 102 through the supply passage 114, using the recycled water. By the function of the humidifier 130, the membrane electrode structure in the fuel cell stack 102 during power generation can be kept in a moist state suitable for power generation.

Also, the fuel cell system 100 may further comprises a cooling system, for example, may comprise a water pump 150, a water inlet passage 152a, a water outlet passage 152b, a water inlet 154a, and a water outlet 154b. The water pump (or refrigerant pump) 150 may pressurize the water (or refrigerant) and supply the water into the fuel cell stack 102 from the water inlet 154a of the fuel cell stack 102 via the water inlet passage 152a for cooling. The heat-exchanged water (or refrigerant) is discharged from the water outlet 154b of the fuel cell stack 102, and the heat-exchanged water (or refrigerant) is delivered to a radiator (not shown) through the water outlet passage 152b. In this way, the heat-exchanged water (or refrigerant) can be cooled, and then the water (or refrigerant) can be supplied to the fuel cell stack 102 by the water pump 150 in a repeated cycle. In this way, the temperature of the fuel cell stack 102 can be controlled below the upper limit temperature to protect the fuel cell stack 102.

According to an embodiment of the disclosure, the fuel cell system 100 further comprises a bypass passage 112 that is configured to communicate between the supply passage 114 and the discharge passage 110. In one embodiment, a circulation pump 140 is provided on the bypass passage 122. The circulation pump 140 may circulate the off-gas discharged from the discharge passage 110 toward the supply passage 114 in the stop process of the fuel cell system 100.

According to an embodiment of the present invention, the bypass passage 112 may comprises a first bypass passage 112a and a second bypass passage 112b. The first bypass passage 112a is a passage branched off from the downstream side of the second discharge passage 110 of the discharge passage 110, and is connected to the circulation pump 140. The second bypass passage 112b is connected between the circulation pump 140 and the first supply passage 114a of the supply passage 114. In this way, during the stop process of the fuel cell system 100, the off-gas discharged from the discharge passage 110 (especially the second discharge passage 110b) may be supplied to the circulation pump 140 through the first bypass passage 112a. The circulating pump 140 then circulates the off-gas to the humidifier 130 through the second bypass passage 112b and the first supply passage 114a for humidification, and finally supplies the air to the fuel cell stack 102 through the second supply passage 114b. Therefore, by the circulation pump 140, in the stop process of the fuel cell system 100, the off-gas discharged from the discharge passage 110 can be circulated toward the supply passage 114 and then to the fuel cell stack 102.

According to an embodiment of the disclosure, the discharge passage 110 has a cooling passage 116a having a heat sink 180 as shown in FIGS. 2A-2D. In general, the heat sink 180 and the cooling passage 116a are fixed to each other by connection using bolt or welding, etc., or by using an integrated structure of a pipe pf the heat sink 180 and the cooling passage 116a. By the heat sink 180, moisture in the off-gas discharged from the discharge outlet 104b of the fuel cell stack 102 can be condensed.

Figure 2A:
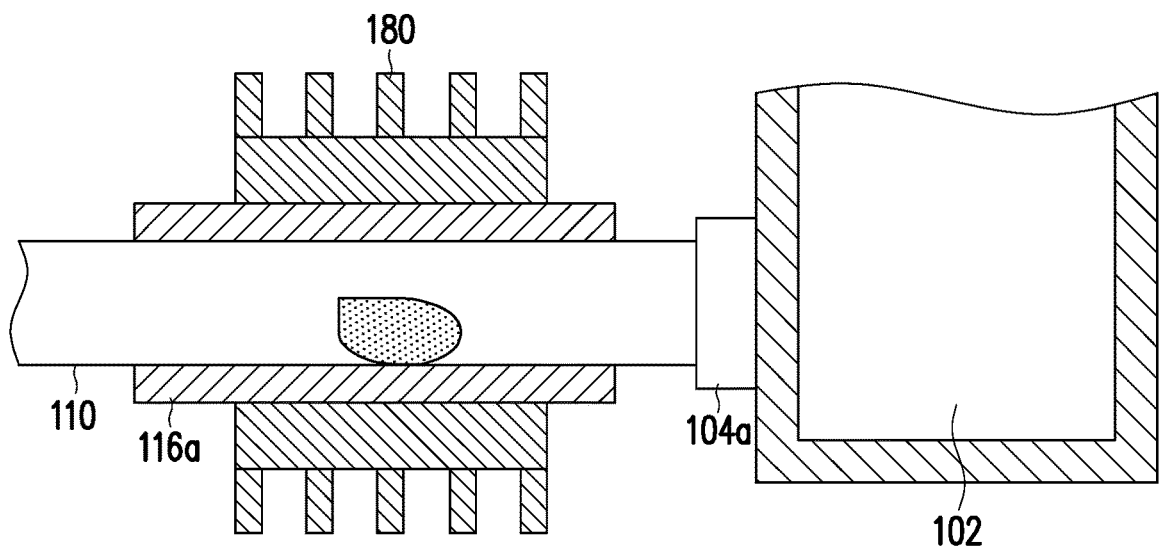
FIGS. 2A-2D illustrate and examples of arrangements of a heat sink for the cooling passage of the fuel cell system.
Figure 2B:
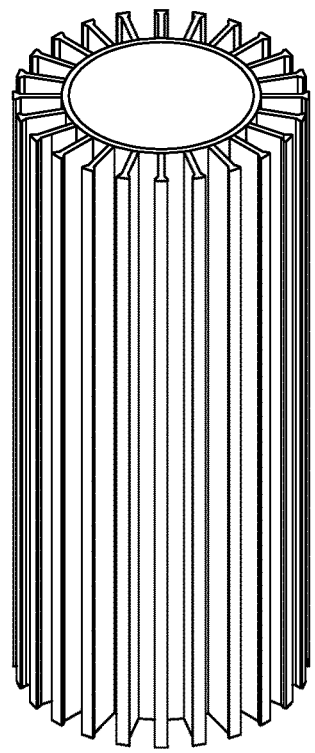
Figure 2C:
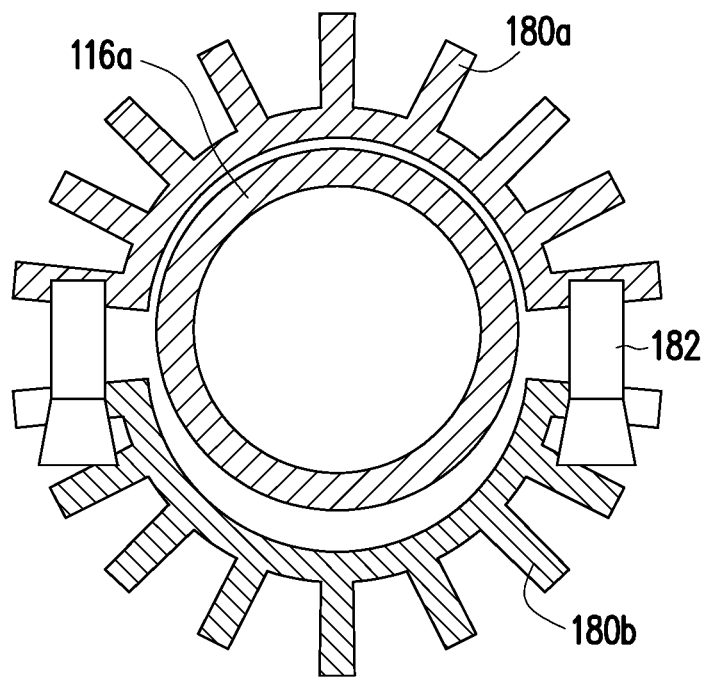
Figure 2D:
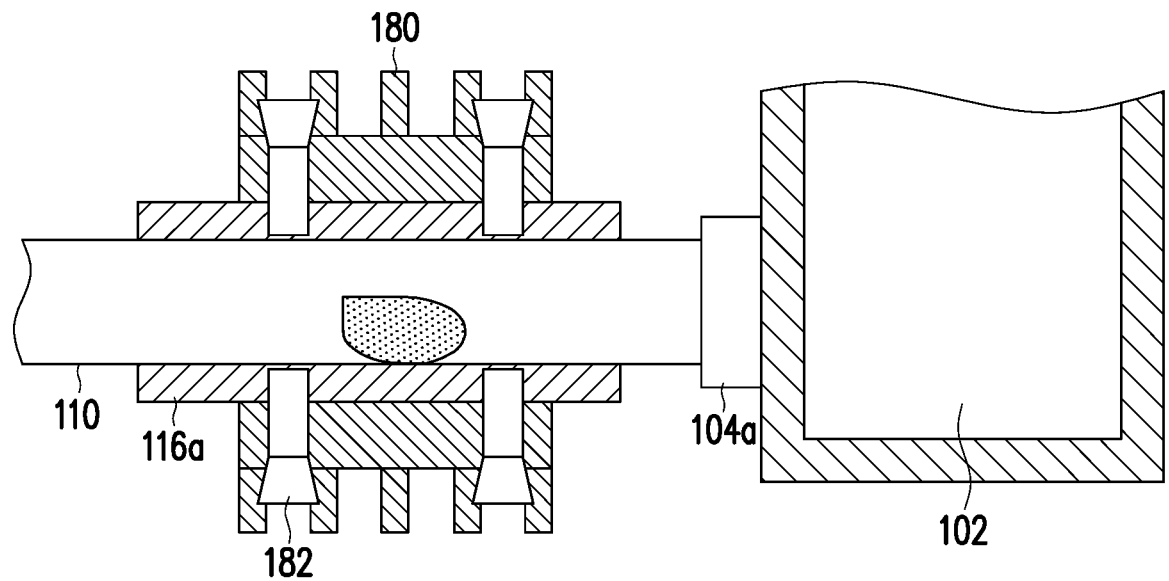

FIGS. 2A and 2D illustrates examples of the heat sink 180, which is a kind of cooling structure for integrated cooling and heat sink jointed pipe. This illustrated heat sink 180 has functions of both cooling and heat sinking. This illustrated heat sink 180 may use screws and O-ring (sealing ring), or use a flange to connect to the connection portion (to the discharge passage 110) of the manifold, or may use the. FIG. 2C illustrates another example of heat sink 180, which includes two semi-circular heat sinks 180a, 180b. It is covered from both ends of the cooling passage 116a is covered by the semi-circular heat sinks 180a, 180b from two sides of the cooling passage 116a, and then the two semi-circular heat sinks 180a, 180b are fixed by bolts or welding. As shown in FIG. 2D, the heat sink 180 can be attached to each side of the angular cooling passage 116a, and fixed with bolts 182 or the like. Alternatively, a cylindrical flexible heat sink may be wound around the cooling passage 116a, and then fixed with bolts 182 or the like.

According to the above fuel cell system 100, since the discharge passage 110 in this embodiment has the cooling passage 116a and the bypass passage 112 has the circulation pump 140, therefore, in the power generation stop process of the fuel cell system 100, the air in the fuel cell stack 102 is sent to the cooling passage 116a by the circulation pump 140, and the off-gas is condensed. Therefore, the humidity of the air can be reduced, and the dew condensation in the fuel cell stack 102 can be prevented.

The fuel cell system 100 further comprises a controller 200 for controlling all components of the fuel cell system 100. The controller 200 is usually implemented by an ECU (Electronic Control Unit), which may control the operations of the various components of the vehicle including the fuel cell system 100 described above. The controller 200 may control the components, such as the fuel cell stack 102, the humidifier 130, the circulation pump 140 in FIG. 1. The controller 200 may transmit control signals to these components and receive response signals from the components.

The fuel cell system 100 further comprises a temperature information acquisition unit 210. The temperature information acquisition unit 210 is used to acquire temperature information of the fuel cell stack 102. In one embodiment, a temperature sensor may be used as the temperature information acquisition unit. The temperature sensor may be provided in the fuel cell stack 102 or in the vicinity of the fuel cell stack 102. After the temperature sensor senses the temperature information, the temperature information is provided to the controller 200. Then, the controller 200 may activate or stop the circulation pump 140 based on the temperature information. Alternatively, the temperature information acquisition unit 210 may be implemented by the controller 200, and thus the temperature information acquisition unit 210 of controller 200 can acquire the temperature information sensed by the temperature sensor.

The fuel cell system 100 further comprises an impedance acquisition unit 212. The impedance acquisition unit 212 is used to acquire the impedance of the fuel cell stack 102. In one embodiment. Then, the controller 200 may activate or stop the circulation pump 140 based on the temperature information. Alternatively, the impedance acquisition unit 212 may be implemented by the controller 200, and thus the impedance acquisition unit 212 of controller 200 can acquire the impedance of the fuel cell stack 102.

The lower the impedance of the fuel cell stack 102 is, more moisture (water) in the fuel cell stack 102 there is and thus the water is easily condensed. If there is more water in the fuel cell stack 102, the water in the electrolyte membrane is increased. As a result, the protons in the electrolyte membrane are also increased and the easy to conduct the electricity is easily conducted, so that the impedance of the fuel cell stack 102 becomes lower. Therefore, in addition to the temperature of the fuel cell stack 102, the impedance should be also considered to deal with the issue of dew condensation.

Figure 3:
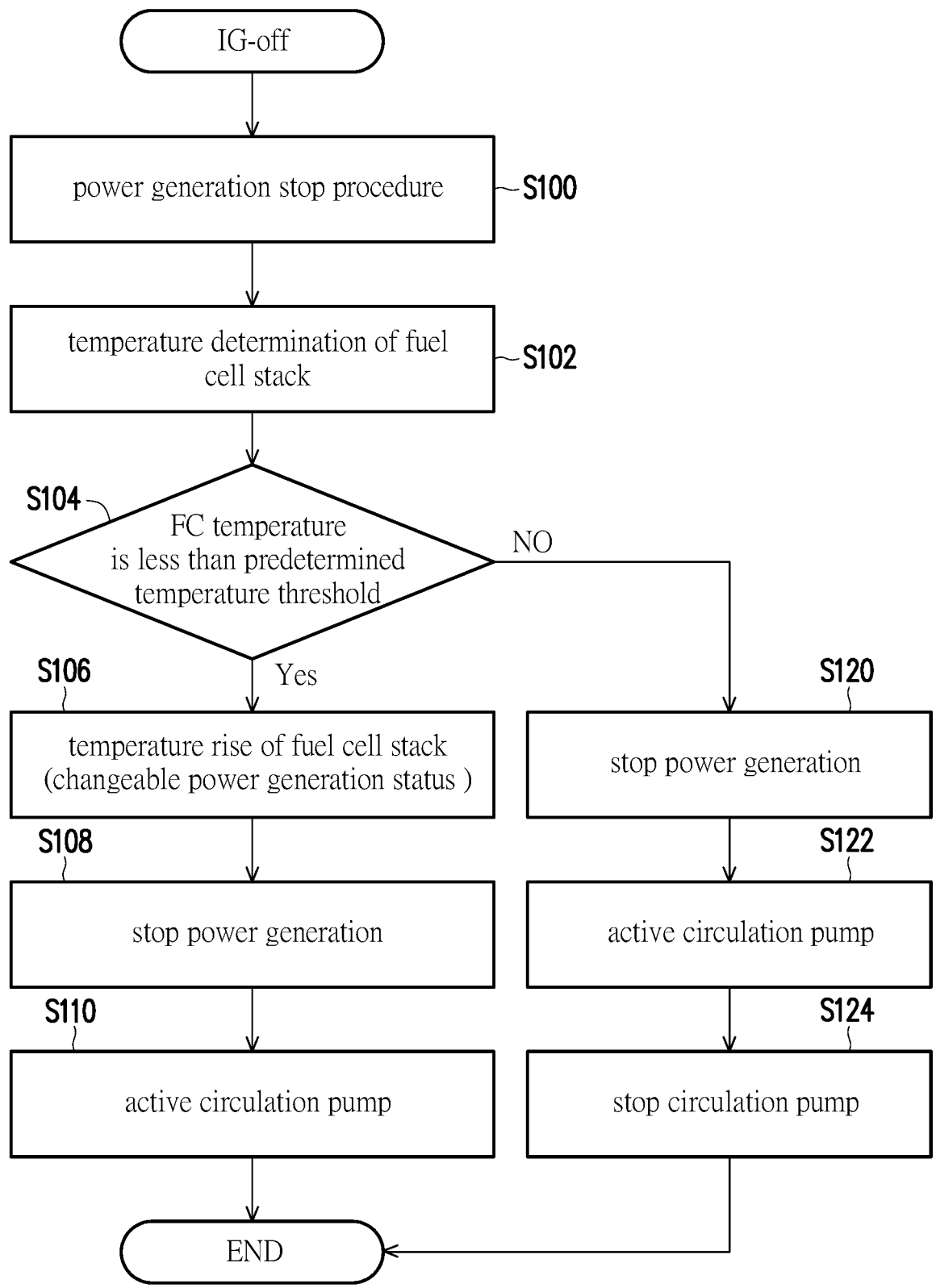
FIG. 3 is a flow chat illustrating a control process of the fuel cell system according to one embodiment of the disclosure.

FIG. 3 is a flow chat illustrating a control process of the fuel cell system according to one embodiment of the disclosure.

Referring to FIGS. 1 and 3, at step S100, when the ignition switch of a vehicle is turned off. The fuel cell system 100 that generates electricity power and supplies the electricity power to the vehicle to drive the vehicle to move enters the power generation stop procedure.

At Step 102, it determines the temperature of the fuel cell stack 102. For example, the temperature information acquisition unit 210 starts acquiring temperature information of the fuel cell stack 102. In one embodiment, a temperature sensor can be used to sense (acquire) the temperature of the fuel cell stack 102. The acquired temperature information may be then provided to the controller 200.

At Step 104, it determines whether the temperature of the fuel cell stack 102 is less than a predetermined temperature threshold. If the temperature of the fuel cell stack 102 is not less than a predetermined temperature threshold ("No", at Step S104), i.e., the temperature of the fuel cell stack 102 is equal to or larger than the predetermined temperature threshold, the control process proceeds to Step S120.

At Step S120, the power generation of the fuel cell system 100 is stopped. Then, at Step S122, during the power generation of the fuel cell system 100 being stopped, the controller 200 activates the circulation pump 140. The detail operation of the circulation pump 140 can be referred to the descriptions related to FIG. 1. At Step S124, after a predetermine time from the circulation pump 140 being activated, the controller 200 stops the circulation pump 140, and the control process ends.

When the temperature information is equal to or larger than the predetermined threshold temperature during the stop procedure of the power generation of the fuel cell system, since the circulation pump 140 is activated and the cooling passage 110 is arranged at the discharge passage 110, the air in the fuel cell stack 102 is supplied to the cooling passage 116a by the circulation pump 140 and then is condensed when the power generation is stopped. Therefore, the humidity of the air in the fuel cell stack may be reduced and the dew condensation in the fuel cell stack 102 can be prevented.

At Step S104, if the temperature of the fuel cell stack 102 is less than the predetermined temperature threshold ("Yes", at Step S104), the control process proceeds to Step S106. At Step S106, the fuel cell system 100 performs the power generation with low amount of coolant to increase the temperature of the fuel cell stack 102. Namely, during the stop procedure of the fuel cell system, in a case that the temperature information is less than the predetermined threshold temperature, the controller 200 is configured to perform a temperature rise for the fuel cell system and activate the circulation pump. To cause the temperature rise, an example is that the fuel cell system 100 performs the power generation with low amount of coolant, which is lower than the coolant amount than the normal operation of the fuel cell system 100.

According to another embodiment, after the fuel cell stack 102 is stopped, in a case that the temperature information of the fuel cell stack 102 is less than the predetermined threshold temperature, the controller 200 performs a temperature rise for the fuel cell system 100 and activates the circulation pump 140. In this case, even though the fuel cell stack 102 of the fuel cell system is stopped, the humidity of the air in the fuel cell stack may still be reduced and the dew condensation in the fuel cell stack 102 can be prevented.

In one embodiment, when the impedance of the fuel cell stack 102 is equal to or larger than the predetermined threshold value during the stop procedure of the power generation of the fuel cell system, the circulation pump 140 is activated. Since the circulation pump 140 is activated and the cooling passage 110 is arranged at the discharge passage 110, the air in the fuel cell stack 102 is supplied to the cooling passage 116a by the circulation pump 140 and then is condensed when the power generation is stopped. Therefore, the humidity of the air in the fuel cell stack may be reduced and the dew condensation in the fuel cell stack 102 can be prevented.

In addition, when the impedance of the fuel cell stack 102 is less than the predetermined threshold value during the stop procedure of the power generation of the fuel cell system, the controller 100 performs a temperature rise for the fuel cell system 100 and activates the circulation pump 140. Therefore, the humidity of the air in the fuel cell stack may still be reduced and the dew condensation in the fuel cell stack 102 can be prevented.

In one embodiment, after the fuel cell stack 102 is stopped, in a case that the impedance of the fuel cell stack 102 is less than the predetermined threshold value, the controller 200 performs a temperature rise for the fuel cell system 100 and activates the circulation pump 140. In this case, even though the fuel cell stack 102 of the fuel cell system is stopped, the humidity of the air in the fuel cell stack may still be reduced and the dew condensation in the fuel cell stack 102 can be prevented.

Figure 4:
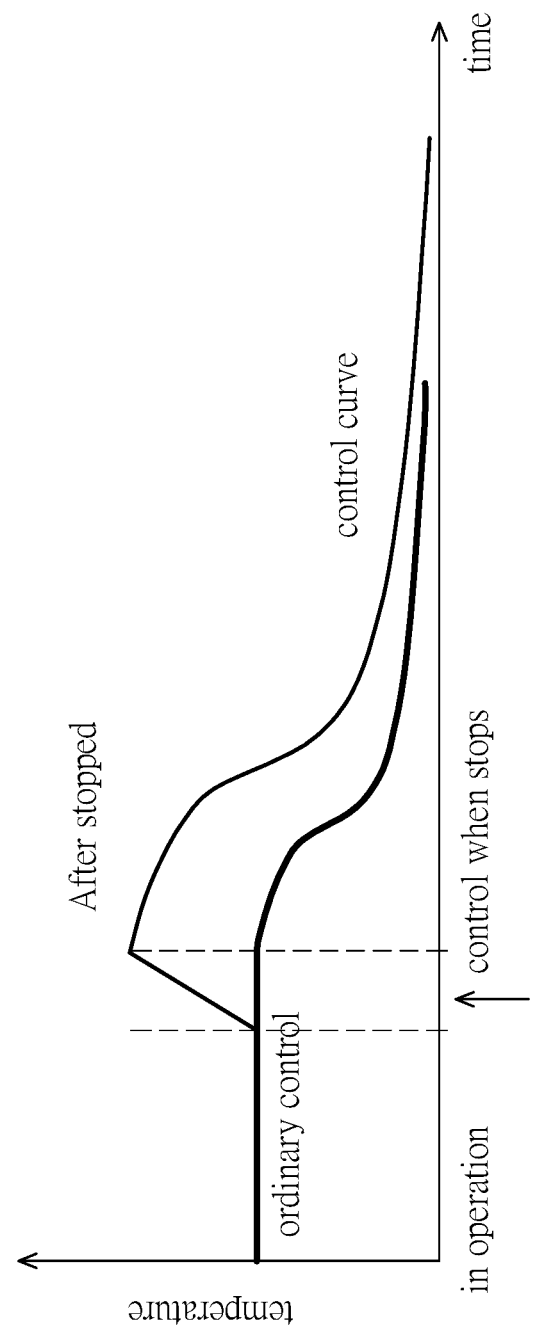
FIG. 4 illustrates a diagram of temperature versus time for the changeable power generation of the fuel cell system.

FIG. 4 illustrates a diagram of temperature versus time for the changeable power generation of the fuel cell system. As shown in FIG. 4, during the normal operation of the fuel cell system 100, the temperature of the fuel cell stack 102 is substantially kept constant. After the power generation is stopped, the control curve indicates the Therefore temperature of the fuel cell stack 102 is increased for a predetermined time.

At Step S108, the power generation of the fuel cell system 100 is stopped. Then, at Step S110, during the power generation of the fuel cell system 100 being stopped, the controller 200 activates the circulation pump 140. The detail operation of the circulation pump 140 can be referred to the descriptions related to FIG. 1. At Step S112, after a predetermine time from the circulation pump 140 being activated, the controller 200 stops the circulation pump 140, and the control process ends.

In this situation, when the fuel cell system 100 is stopped and the ambient temperature is low, the dew condensation will soon occur inside the fuel cell stack 102. If the temperature of the fuel cell stack 102 is lower than the predetermined threshold temperature, the temperature of the fuel cell stack 102 is raised (the temperature may be raised from an external source, such as a power generation heater), and the circulation pump is activated by the controller 200. Therefore, when the ambient temperature is low, the dew condensation inside the fuel cell stack 102 can be immediately prevented. In addition, since the circulation pump 140 is activated, the humidity of the air inside the fuel cell stack 102 can be reduced and the dew condensation inside the fuel cell stack 102 can be also prevented.

When the temperature is equal to or lower than the threshold temperature, the power generation of the fuel cell system is performed with a lower amount of the coolant than the normal power generation of the fuel cell system 100. Therefore, the temperature of the fuel cell stack 102 is raised more rapidly than in normal power generation, and thus the power generation time can be shortened.

Figure 5:
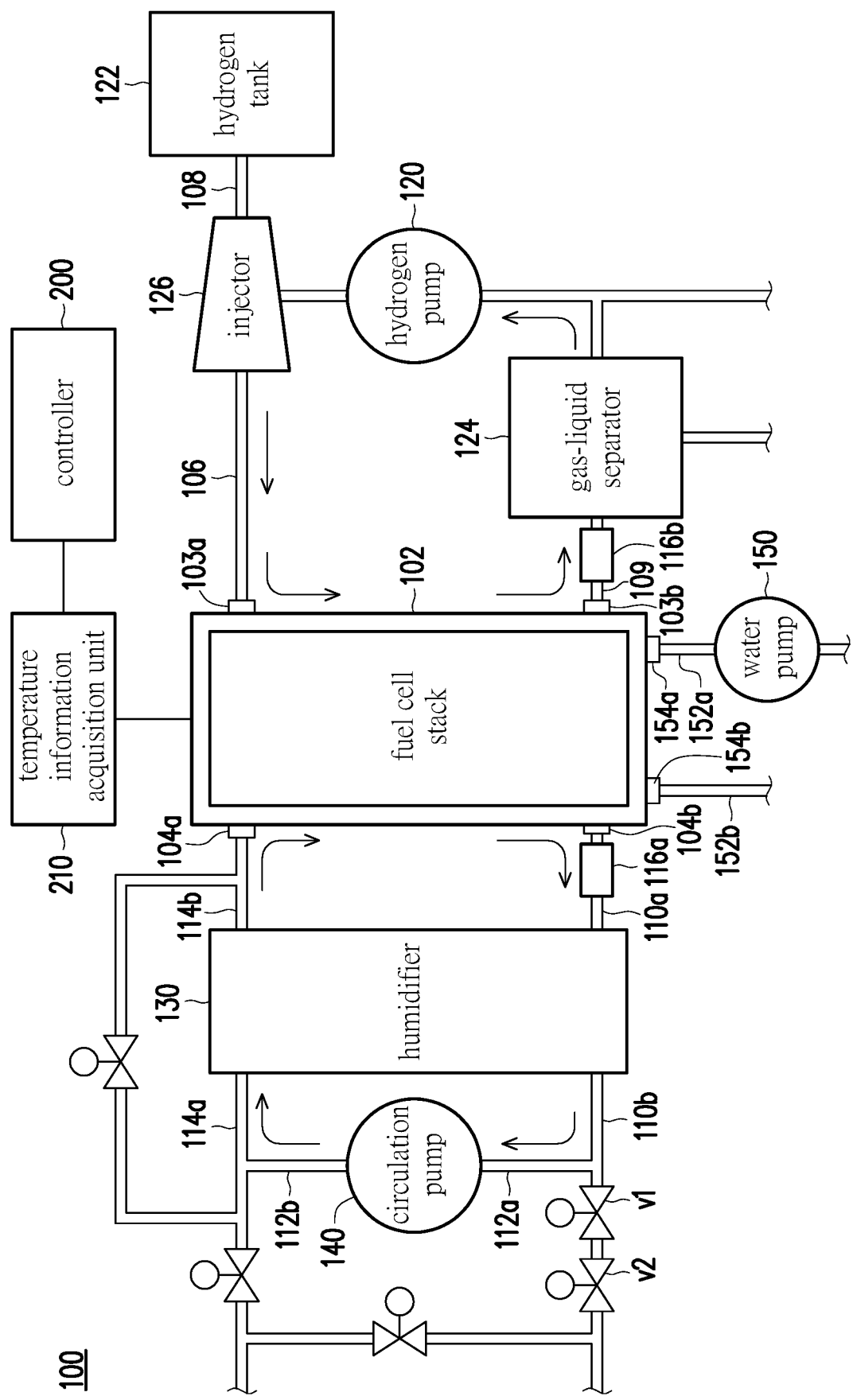
FIG. 5 is a schematic diagram illustrating another configuration of a fuel cell system according to another embodiment of the disclosure.

FIG. 5 is a schematic diagram illustrating another configuration of a fuel cell system according to another embodiment of the disclosure. In FIG. 5, the same or similar components as those in FIG. 1 are labelled with the same reference numerals, and the corresponding descriptions thereof are also omitted. The differences therebetween are described below.

As shown in FIG. 5, in this embodiment, a cooling passage 116b is arranged on the anode system side (or the fuel gas side). That is, the cooling passage 116b is provided on the discharge passage 109 connected to the hydrogen discharge outlet 103b. Further, the cooling passage 116b is provided between the gas-liquid separators 125 and the fuel cell stack 102. By providing the cooling passage 116b on the fuel gas side, the condensed water can be quickly supplied to the gas-liquid separator 124.

Also, according to the embodiment of the disclosure, the fuel cell system 100 may simultaneously provide the cooling passage 116a on the cathode system side and the cooling passage 116b on the combustion gas side (anode system side); however, the cooling passage 116a or the cooling passage 116b may be provided on either side.

Figure 6:
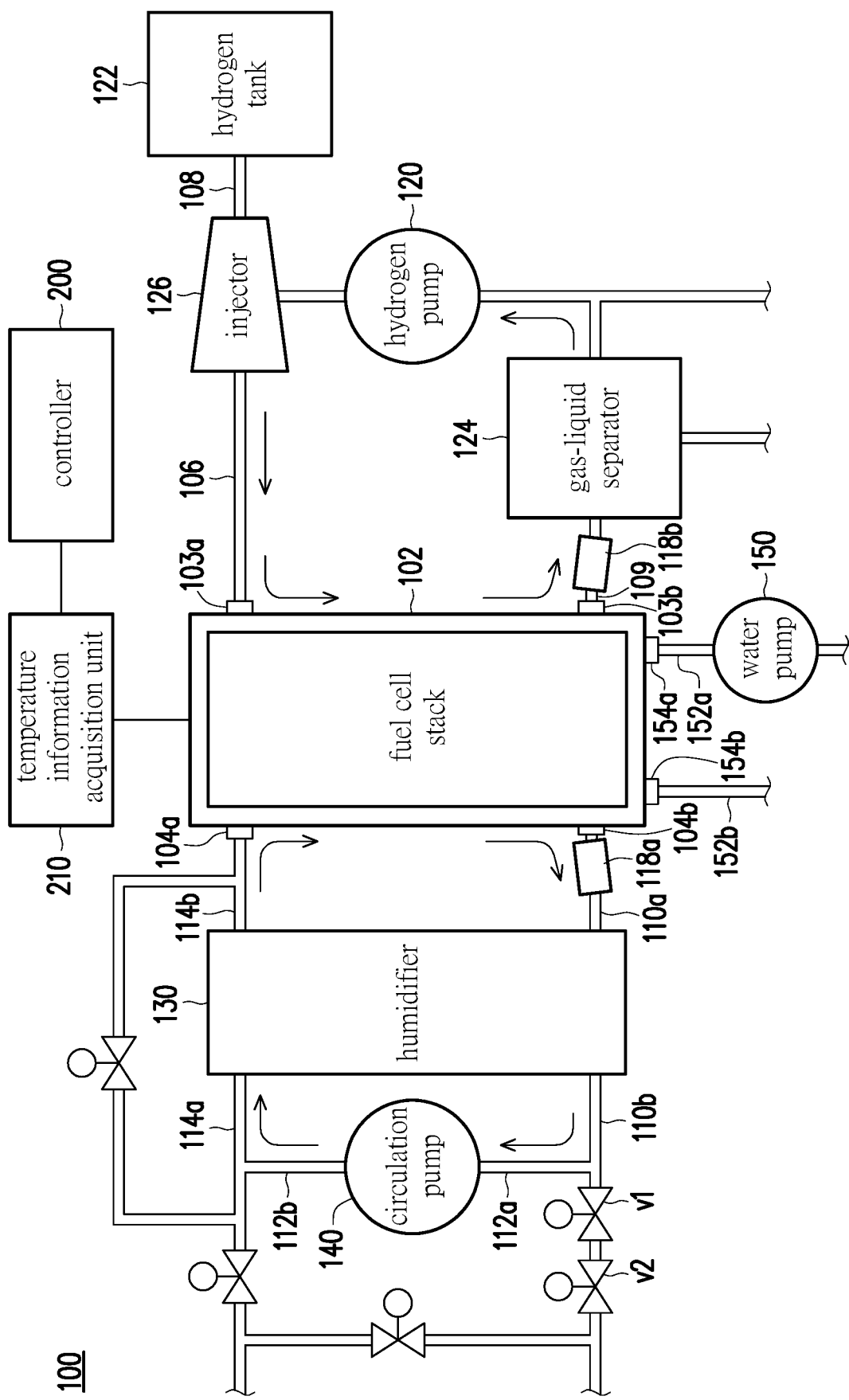
FIG. 6 is a schematic diagram illustrating another configuration of a fuel cell system according to another embodiment of the disclosure.

FIG. 6 is a schematic diagram illustrating another configuration of a fuel cell system according to another embodiment of the disclosure. In FIG. 6, the same or similar components as those in FIG. 1 are labelled with the same reference numerals, and the corresponding descriptions thereof are also omitted. The differences therebetween are described below.

As shown in FIG. 6, a cooling passage 118a is provided on the cathode system side (oxidant gas side) and is connected between the fuel cell stack 102 and the humidifier 130, and a cooling passage 118b is provided on the anode system side (combustion gas side) and is connected between the fuel cell stack 102 and the gas-liquid separator 125. In this embodiment, in the installed status of the fuel cell system 100, the cooling passage 118a is inclined downwards from the discharge outlet 104b to the discharge passage 110 (the first discharge passage 110a), and the cooling passage 118b is inclined downwards from the hydrogen discharge outlet 103b to the discharge passage 119.

With this configuration, since the cooling passages 118a, 118b are inclined, and by causing the water generated by dew condensation to flow to the discharge passages 110, 109, the accumulation of water in the cooling passages 118a, 118b is prevented, and the dew condensation in the fuel cell stack is also prevented.

Also, according to the embodiment of the disclosure, the fuel cell system 100 may provide the cooling passage 118a on the cathode system side (oxidant gas side) and the cooling passage 118b on the anode system side (combustion gas side); however, the cooling passage 118a or the cooling passage 118b may be provided on either side.

In addition, the control process shown in FIG. 3 may be also applied to the configurations illustrated in FIGS. 5 and 6.

Figure 7:
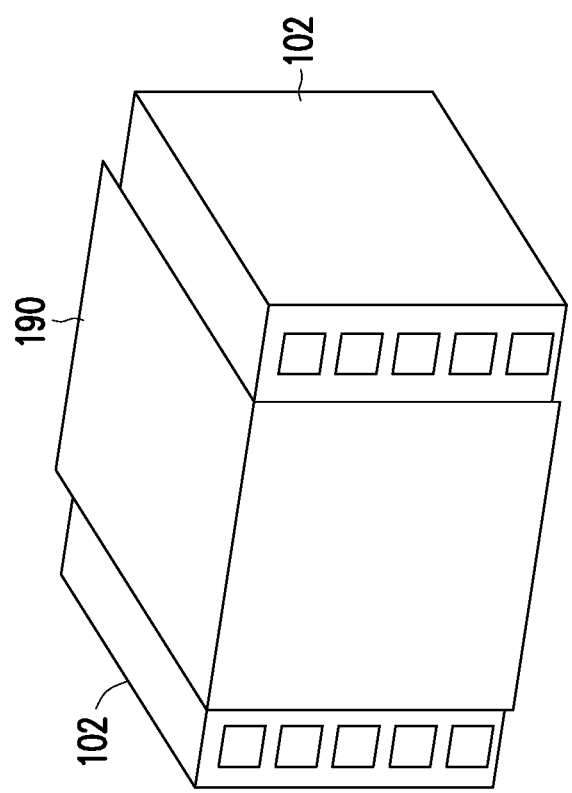
FIG. 7 is a schematic diagram of a heat preservation member of a fuel cell stack.

FIG. 7 is a schematic diagram of a heat preservation member of a fuel cell stack. As shown in FIG. 7, the fuel cell stack 102 may be covered with a heat preservation member (insulation member) 190, so that the temperature of the fuel cell stack 102 may be kept. In this way, since the fuel cell stack 102 is covered with the heat preservation member 190, it is possible to prevent the dew condensation inside the fuel cell stack 102 when the power generation of the fuel cell system 100 is stopped. Also, in this way, the humidity of the air in the fuel cell stack 102 can be lowered before the dew condensation occurs, and the dew condensation can be prevented. As an example, the heat preservation member 190 may be a member suitable for thermal insulation, such as a heater.

In the example shown in FIG. 7, the heat preservation member 190 only covers the fuel cell stack 102 from both sides, but in other embodiment of the disclosure, the heat preservation member 190 can also cover the entire fuel cell stack 102 as long as the operation of the fuel cell stack 102 is not affected.

Other Configuration

According to one aspect of the disclosure, a fuel cell system having a fuel cell stack that is supplied with a reaction gas and performs a power generation by an electrochemical reaction of the reaction gas is provided. The fuel cell system comprises a supply passage, configured to supply the reaction gas to the fuel cell stack; a discharge passage, configured to distribute an off-gas that is discharged from a discharge outlet of the fuel cell stack; a bypass passage, communicated between the supply passage and the discharge passage; a cooling passage, provided in the discharge passage and having a heat sink to condense water in the off-gas; a circulation pump, provided in the bypass passage and configured to circulate the off-gas discharged from the discharge passage to the supply passage during a stop procedure of the fuel cell system; a controller, configured to control the fuel cell system; and a temperature information acquisition unit, configured to acquire temperature information of the fuel cell stack. During the stop procedure of the fuel cell system, in a case that the temperature information is equal to or larger than a predetermined threshold temperature, the controller is configured to activate the circulation pump.

According to one aspect of the disclosure, in the fuel cell system, during the stop procedure of the fuel cell system, in a case that the temperature information is less than the predetermined threshold temperature, the controller is configured to perform a temperature rise for the fuel cell system and activate the circulation pump.

According to one aspect of the disclosure, in the fuel cell system, the temperature rise is changeable to a power generation in which an amount of a coolant is reduced from that during a normal operation of the fuel cell system.

According to one aspect of the disclosure, in the fuel cell system, the cooling passage is connected to the discharge outlet of the fuel cell stack, and under an installation status of the fuel cell system, the cooling passage is inclined downwards from the discharge outlet to the discharge passage.

According to one aspect of the disclosure, in the fuel cell system, the reaction gas is the oxidant gas, the cooling passage is arranged between a humidifier and the fuel cell stack, and the humidifier is configured to supply water contained in the off-gas that is discharged from the discharge outlet of the fuel cell stack to the reaction gas that is supplied to the fuel cell stack.

According to one aspect of the disclosure, in the fuel cell system, the reaction gas is a fuel gas, and the cooling passage is provided between a gas-liquid separator for separating water contained in the off-gas and the fuel cell stack.

According to one aspect of the disclosure, in the fuel cell system, the fuel cell system further comprises a heat preservation member, covering the fuel cell stack.

Also, although not shown, the fuel cell system 100 according to the embodiment of the disclosure can supply the generated electric power to the motor of the vehicle, so as to drive the motor to drive the vehicle. In addition, the fuel cell system 100 of the embodiments of the disclosure can supply the generated electric power to a battery for storage, and can also supply the stored electric power to the motor of the vehicle from the battery.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fuel cell system, having a fuel cell stack that is supplied with a reaction gas and performs a power generation by an electrochemical reaction of the reaction gas, the fuel cell system comprising:
   a supply passage, configured to supply the reaction gas to the fuel cell stack;
   a discharge passage, configured to distribute an off-gas that is discharged from a discharge outlet of the fuel cell stack;
   a bypass passage, communicated between the supply passage and the discharge passage;
   a cooling passage, provided in the discharge passage and having a heat sink to condense water in the off-gas;
   a circulation pump, provided in the bypass passage and configured to circulate the off-gas discharged from the discharge passage to the supply passage during a stop procedure of the fuel cell system;
   a controller, configured to control the fuel cell system; and
   a temperature information acquisition unit, configured to acquire temperature information of the fuel cell stack
   wherein during the stop procedure of the fuel cell system, in a case that the temperature information is equal to or larger than a predetermined threshold temperature and after the power generation of the fuel cell system is stopped, the controller is configured to activate the circulation pump.

2. The fuel cell system according to claim 1, wherein during the stop procedure of the fuel cell system, in a case that the temperature information is less than the predetermined threshold temperature, the controller is configured to perform a temperature rise for the fuel cell system and activate the circulation pump.

3. The fuel cell system according to claim 2, wherein the temperature rise is changeable to a power generation in which an amount of a coolant is reduced from that during a normal operation of the fuel cell system.

4. The fuel cell system according to claim 1, wherein after the fuel cell stack is stopped, in a case that the temperature information is less than the predetermined threshold temperature, the controller is configured to perform a temperature rise for the fuel cell system and activate the circulation pump.

5. The fuel cell system according to claim 1, further comprising an impedance acquisition unit configured to acquire an impedance of the fuel cell stack,
   during the stop procedure of the fuel cell system, in a case that the impedance is equal to or larger than a predetermined threshold value, the controller is configured to activate the circulation pump.

6. The fuel cell system according to claim 5, wherein during the stop procedure of the fuel cell system, in a case that the impedance is less than the predetermined threshold value, the controller is configured to perform a temperature rise for the fuel cell system and activate the circulation pump.

7. The fuel cell system according to claim 5, wherein after the fuel cell stack is stopped, in a case that the impedance is less than the predetermined threshold temperature, the controller is configured to perform a temperature rise for the fuel cell system and activate the circulation pump.

8. The fuel cell system according to claim 1, wherein
   the cooling passage is connected to the discharge outlet of the fuel cell stack, and
   under an installation status of the fuel cell system, the cooling passage is inclined downwards from the discharge outlet to the discharge passage.

9. The fuel cell system according to claim 1, wherein
   the reaction gas is the oxidant gas, and
   the cooling passage is arranged between a humidifier and the fuel cell stack,
   the humidifier is configured to supply water contained in the off-gas that is discharged from the discharge outlet of the fuel cell stack to the reaction gas that is supplied to the fuel cell stack.

10. The fuel cell system according to claim 2, wherein
    the reaction gas is the oxidant gas, and
    the cooling passage is arranged between a humidifier and the fuel cell stack,
    the humidifier is configured to supply water contained in the off-gas that is discharged from the discharge outlet of the fuel cell stack to the reaction gas that is supplied to the fuel cell stack.

11. The fuel cell system according to claim 3, wherein
    the reaction gas is the oxidant gas, and
    the cooling passage is arranged between a humidifier and the fuel cell stack,
    the humidifier is configured to supply water contained in the off-gas that is discharged from the discharge outlet of the fuel cell stack to the reaction gas that is supplied to the fuel cell stack.

12. The fuel cell system according to claim 8, wherein
    the reaction gas is the oxidant gas, and
    the cooling passage is arranged between a humidifier and the fuel cell stack, the humidifier is configured to supply water contained in the off-gas that is discharged from the discharge outlet of the fuel cell stack to the reaction gas that is supplied to the fuel cell stack.

13. The fuel cell system according to claim 1, wherein the reaction gas is a fuel gas, and
the cooling passage is provided between a gas-liquid separator for separating water contained in the off-gas and the fuel cell stack.

14. The fuel cell system according to claim 2, wherein the reaction gas is a fuel gas, and
the cooling passage is provided between a gas-liquid separator for separating water contained in the off-gas and the fuel cell stack.

15. The fuel cell system according to claim 3, wherein the reaction gas is a fuel gas, and
the cooling passage is provided between a gas-liquid separator for separating water contained in the off-gas and the fuel cell stack.

16. The fuel cell system according to claim 8, wherein the reaction gas is a fuel gas, and
the cooling passage is provided between a gas-liquid separator for separating water contained in the off-gas and the fuel cell stack.

17. The fuel cell system according to claim 1, further comprises a heat preservation member, covering the fuel cell stack.

* * * * *